UNITED STATES PATENT OFFICE.

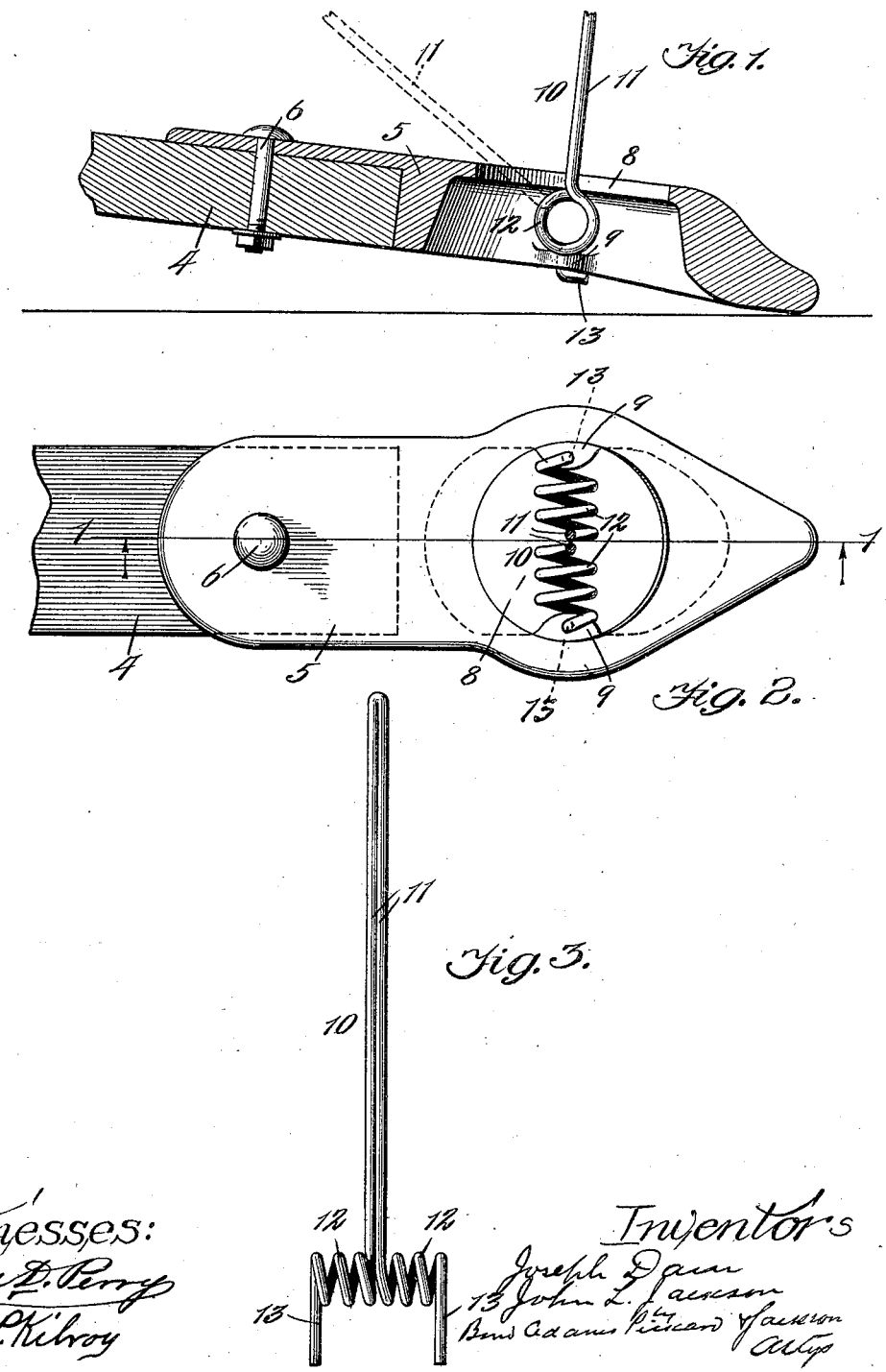

JOSEPH DAIN, OF OTTUMWA, IOWA, AND JOHN L. JACKSON, OF RIVER FOREST, ILLINOIS, ASSIGNORS TO DAIN MANUFACTURING COMPANY, OF OTTUMWA, IOWA, A CORPORATION OF IOWA.

HAY-RETAINER FOR HAY-STACKERS.

No. 921,954.  Specification of Letters Patent.  Patented May 18, 1909.

Application filed December 4, 1907. Serial No. 405,073.

*To all whom it may concern:*

Be it known that we, JOSEPH DAIN, a citizen of the United States, residing at Ottumwa, county of Wapello, State of Iowa, and JOHN L. JACKSON, a citizen of the United States, residing at River Forest, county of Cook, State of Illinois, have invented certain new and useful Improvements in Hay-Retainers for Hay-Stackers, of which the following is a specification, reference being had to the accompanying drawings.

Our invention relates to hay retainers for hay stackers, and particularly to improvements upon the hay retainer shown and described in the application of Joseph Dain, Serial No. 325,410, filed July 9, 1906, and its object is to provide a new and improved retaining tooth for holding the hay upon the stacker fork.

As is well known, in stacking hay in the field by means of a stacking machine, the hay is raked upon the stacker fork by means of a rake generally known as a "bull-rake" which is driven upon the stacker head. The rake is then backed off to permit the stacker head to be raised to deposit the hay upon the stack. Unless some means is provided to prevent it, the backing of the rake away from the stacker head will drag some of the hay with it, causing a scattering and consequent loss of the hay, and various devices have been invented for the purpose of retaining the hay upon the stacker head. Such devices consist, generally speaking, of a finger swingingly or rockingly mounted at the ends of several of the teeth of the stacker head, and adapted to rock or swing backward when the hay is driven upon the stacker head and to spring back into place again when the rack is backed away. In order that these should work properly, it is necessary that the retaining finger should yield not alone backward in the direct line of the teeth, but should yield in all directions in order when the rake is driven upon the stacker head in a more or less diagonal direction, as often happens in practice, that the retaining finger may yield in that direction, and without a breaking of the parts.

It is the object of our invention to provide a new and improved retaining finger for stacker teeth which shall attain these objects and which shall be of simple construction, easy to manufacture, and efficient for the purpose for which it is designed.

In the drawings:—Figure 1 is a longitudinal section on line 1—1 of Fig. 2, with a portion of the retaining finger cut away. Fig. 2 is a top or plan view of the end of one of the stacker teeth with our retainer attached. Fig. 3 is a detail, being a view of the retaining finger and spring ready to be inserted in the holder.

Referring to the drawings, 4 indicates the end of one of the teeth of a stacker head.

5 indicates a holder, preferably cast of any suitable metal, which is bolted to the end of a tooth by means of a bolt 6. The holder 5 is provided with a chamber 7 which opens through the top of the holder by a suitable opening 8.

9 indicate shoulders which are formed on the inside surface of the chamber 7.

10 indicates a retainer which is preferably formed of a single piece of spring wire into an upright finger 11 and spiral springs 12, which, as is best shown in Figs. 2 and 3, coil in opposite directions upon each side of the finger 11. The free ends of the springs are formed in straight portions 13 which are adapted to be inserted into suitable openings in the shoulders 9 so as to hold the finger 11 normally in an upright position, as best shown in Fig. 1, and the ends 13, as best shown in Fig. 1, are bent under the shoulders 9 to retain the device in position.

When the rake is driven upon the stacker head with a load of hay, it is obvious that the finger 11 will yield in the direction of the strain, as is shown in dotted lines in Fig. 1, with a torsion of the two coils upon each side of the finger. It is also obvious that the finger will yield in any direction in obedience to the strain, the coils permitting this yielding, and will immediately return to normal position as soon as the strain is removed. By having the coils turn in opposite directions upon the two sides of the finger 11, the tendency to twist and throw the coils out of shape with either a forward or backward movement is prevented. It will be also obvious that the swinging or rocking of the stacker tooth under a strain will be accomplished without a bending of the tooth itself which would ultimately cause crystallization and a breaking of the tooth. It is also obvious that by this construction a hay retainer is provided which may be easily removed in case of breaking or damage, and in place of which a new one may be readily substituted.

As the construction of hay stackers and the forks or heads thereon is well understood, and so far as our present invention is concerned may be of any well known character, we have shown only a portion of the end of one of the teeth of such head. It will also be understood that in ordinary practice several of the teeth, preferably the two outer and two or more intermediate teeth, will each be provided with one of the retainers.

What we claim as our invention and desire to secure by Letters Patent is:—

1. In combination with a stacker tooth, a hay retainer consisting of a finger and two spiral springs integral with said finger extending one upon each side thereof and secured at their outer ends to said stacker tooth.

2. The combination with a holder adapted to be secured to a stacker tooth, of a hay retainer consisting of a finger and two spiral springs integral with said finger extending one upon each side thereof near its lower end and adapted to be secured by their opposite ends in said holder.

3. The combination with a holder adapted to be secured to a stacker tooth, of a hay retainer consisting of a finger and two oppositely coiled spiral springs integral with said finger extending one upon each side thereof near its lower end and adapted to be secured by their opposite ends in said holder.

4. The combination with a holder adapted to be secured to a stacker tooth, of a hay retainer consisting of a finger formed of spring wire bent upon itself and two coiled springs integral with said finger and extending one upon each side thereof near its base, and means for securing the free ends of said springs in said holder.

5. In a hay retainer for hay stackers, the combination with a holder adapted to be secured to the end of a stacker tooth and provided with a chamber open at its top and with two perforated shoulders on its inner surface, of a finger formed of spring wire bent upon itself, spiral springs integral with said finger and extending one upon each side of said finger near its base and having their free ends adapted to enter the perforations in said shoulders.

6. A retainer for stacker teeth, consisting of a finger and laterally extending spiral springs one upon each side of said finger near its base and integral therewith and adapted to be secured by their outer ends to a stacker tooth.

7. In a hay retainer for hay stackers, the combination with a stacker tooth provided near its end with a chamber open at its top and having two perforated shoulders on its inner surface, of a finger formed of a spring wire bent upon itself, spiral springs integral with said finger and extending one upon each side of said finger near its base and having their free ends adapted to enter the perforations in said shoulders.

JOSEPH DAIN.
JOHN L. JACKSON.

Witnesses to signature of Joseph Dain:
W. G. DUFFIELD,
H. JONES.

Witnesses to signature of John L. Jackson:
ALBERT H. ADAMS,
CHARLES E. PICKARD.